Aug. 25, 1959 C. WEILL ET AL 2,901,603

CONTROL MEANS FOR PULSE DISTRIBUTORS OPERATING IN SYNCHRONISM

Filed Feb. 2, 1954 3 Sheets-Sheet 1

Inventors
C. WEILL
C. HANNIGSBERG
H. H. ADELAAR
By R. P. Morris
Attorney

Inventors
C. WEILL
C. HANNIGSBERG
H. H. ADELAAR
By [signature]
Attorney

CONTROL MEANS FOR PULSE DISTRIBUTORS OPERATING IN SYNCHRONISM

Filed Feb. 2, 1954 3 Sheets-Sheet 3

Inventors
C. WEILL
C. HANNIGSBERG
H. H. ADELAAR
By [signature]
Attorney

United States Patent Office 2,901,603

Patented Aug. 25, 1959

2,901,603

CONTROL MEANS FOR PULSE DISTRIBUTORS OPERATING IN SYNCHRONISM

Camille Weill, Garches, and Claude Hannigsberg, Vernouillet, France, and Hans Helmut Adelaar, Antwerp, Belgium, assignors to International Standard Electric Corporation, New York, N.Y., a corporation of Delaware Application February 2, 1954, Serial No. 407,742

Claims priority, application Netherlands May 21, 1953

1 Claim. (Cl. 250—27)

Figure 1:
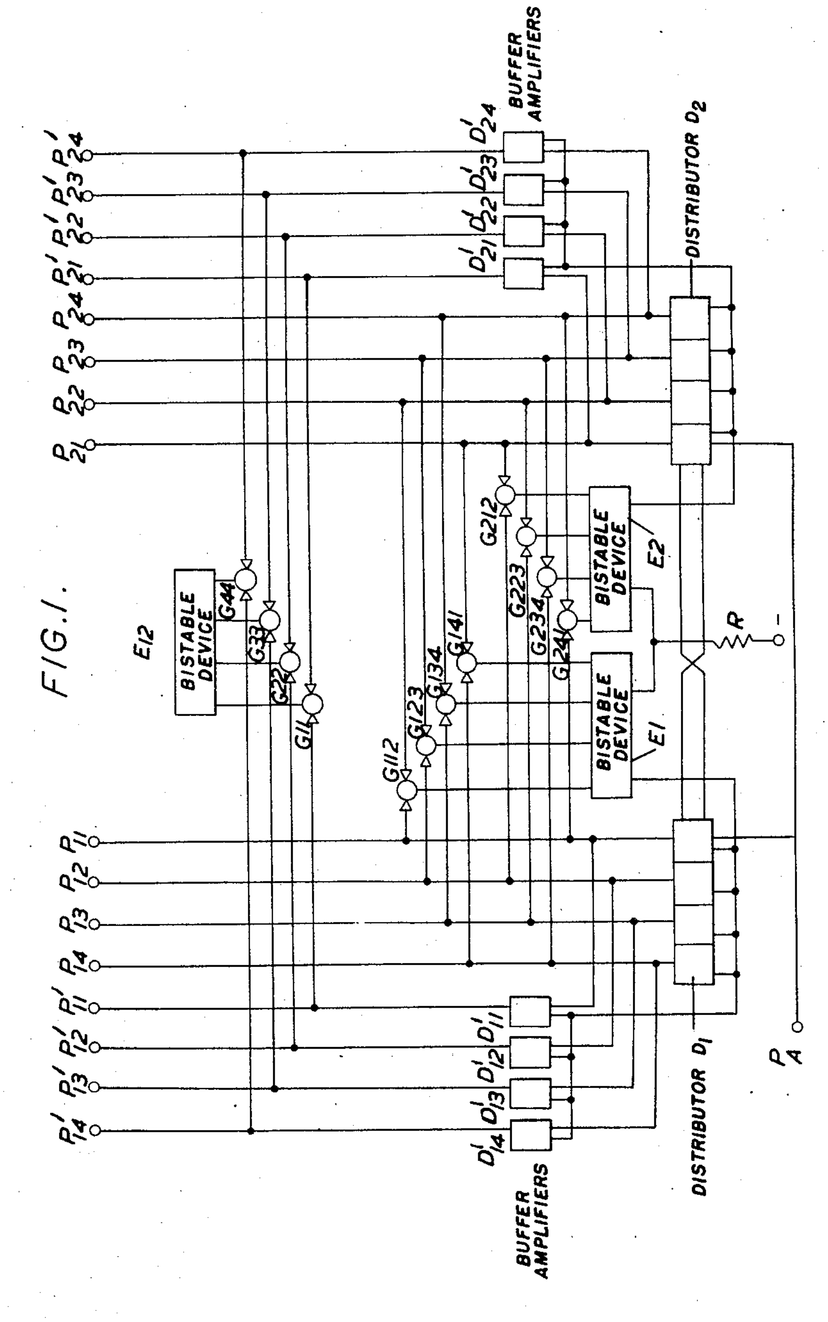

The invention relates to control means for pulse distributors operating in synchronism.

In this description, pulse distributors will be understood to indicate ring type counters including an arbitrary number $n$ of stages with $n$ corresponding outlets and which, when driven by pulses of period T will deliver pulses of duration T at all the $n$ outlets in succession, a pulse of duration T at one outlet being followed upon its disappearance by a pulse of same duration at the next outlet and so on. The period of the pulses issued at the various outlets is therefore the same and equal to $n$T. Such pulses may constitute frames bearing a distinct phase relationship with respect to one another and are useful to control switching devices of the static type such as those affording connections between a common inlet and one out of a plurality of outlets on a time multiplex basis. Since these pulse frames are essential to the good working of such switches which may, for example, be used in telephone exchange equipment, it is imperative that adequate precautions should be taken to ensure that these frames will be continuously available without any interruption which would prejudice the good operation of the telephone equipment.

In the Belgian Patent No. 504,604 (C. Weill-C. Hannigsberg 5–4), an arrangement has been described wherein electronic pulse distributors are used, delivering their identical outputs to common loads via relay contacts. Twin sets of distributors are used and the contacts are normally closed, whereby two identical distributors normally supply half the power necessary. In the case of failure, partial or complete, of one of the distributors, means are provided to detect the failure and as a result thereof the outputs from the failing distributor are disconnected from the common load, whereby only the remaining pulse distributor supplies the power during the time necessary for switching in a separate distributor in place of the defective one. This will mean that each distributor should be designed so that it can supply the full power which may be required. As in this patent, the common loads are constituted by the input circuits of power amplifiers, i.e. high impedance circuits, the power consumption is in any case slight. In order to detect a failure, a pair of corresponding outlets from the two distributors are connected to the two inlets of a potential comparator which reacts upon the potential at one inlet being different from that at the other.

A suitable potential comparator has been disclosed in the Belgian Patent No. 504,605 (C. Weill-C. Hannigsberg 4–3) and is essentially a device with three stable electrical conditions. Three stable electrical conditions are necessary because one of these must be the normal condition when the potentials at both inlets of the comparator behave normally as the corresponding distributors are delivering their normal pulses at the outlets concerned. Then, two other stable conditions are necessary for the comparator because while one distributor issues a normal pulse at the outlet concerned, there might be absence of a pulse at the corresponding outlet of the other distributor and this should lead to the latter distributor being put out of service, while the contrary situation may also arise, in which case it is the former distributor which must be put out of service. This necessitates the use of two gas tubes which are suitable fast responding devices, which are normally de-ionized and one or the other of which is ionized upon one or the other distributor failing to issue a pulse at the outlet concerned and during the normal pulse time interval. Each gas tube circuit has a relay associated with it and one or the other of the two relays is energized upon the absence of a normal pulse at the outlets concerned being detected, resulting in the disconnection of the faulty distributor outputs from the common load.

Such an arrangement, wherein only one out of the $n$ outlets from each distributor is connected to a comparator, is by no means ideal since although in a ring type electronic distributor the absence of a pulse at one outlet will nearly always be followed immediately by absence of pulses at the other outlets, there might occur a time $(n-1)T$ before a failure is detected. This would occur if it is the outlet immediately after the one connected to the comparator which is the first to fail to issue a pulse during its proper pulse time interval. Further, there is an additional delay due to the time taken by an electromagnetic relay to energize subsequent to the firing of a gas tube.

In the Belgian Patent No. 512,583 (C. Weill-C. Hannigsberg 8–7), the maximum delay of $(n-1)T$ seconds is reduced to practically zero by using one bistable device in association with each outlet from each distributor, the bistable device of any outlet from a distributor forming a comparator with the bistable device of the corresponding outlet from the other distributor. To ensure fast response, use is again made of a gas tube which is normally de-ionized but which reacts upon its associated outlet failing to deliver a pulse during its preassigned pulse time interval, when the corresponding outlet from the other distributor delivers a pulse. The gas tube arrangement is similar to that disclosed in the Belgian Patent No. 504,605 mentioned above. The reduction in the time delay is, however, accompanied by a substantial increase in the amount of control equipment needed, since $2n$ gas tubes are now necessary whereas only two were used in the Belgian Patent No. 504,604 mentioned above.

Although in the arrangement of the Belgian Patent No. 512,583 each gas tube associated with a particular outlet from a particular distributor need not have an associated relay in its circuit, a relay equipment being used in common for each distributor in order to disconnect the outputs from the faulty one, the number of gas tubes necessary is directly proportional to the number of outlets of the distributors and becomes large when the distributors have a substantial number of outlets.

An even greater disadvantage of the arrangement appears when a faulty distributor continues to issue a pulse during a time interval following the normal time interval for the outlet concerned. In such case, by virture of the arrangement used, the gas tube associated with the corresponding outlet which is not delivering a pulse during the time interval concerned as required, would also be ionized, possibly resulting in the distributor which functions properly, being put out of service whereas the faulty one might continue to be used.

The object of the invention is to provide improved control means for synchronized pulse distributors and in particular to avoid incorrect distribution of pulses in the case where a distributor fails to issue pulses at the proper outlets and at the proper times, or issues pulses at some outlets at times where these should not normally deliver pulses.

In accordance with a feature of the invention in an arrangement comprising a plurality of $m$ identical pulse generators or distributors each with $n$ outlets, delivering pulses in sequence at their outlets and cyclically, so that each outlet is normally at a first potential value during a time $(n-1)T$ and at a second potential value during a time T, means are provided to detect one or more outlets of one or more of said $n$ generators assuming a potential which is not equal to the potentials present at the same time at the corresponding outlets of the remaining generators, said means comprising $m$ series of $n$ potential comparators each with two inlets and with one outlet, said comparator outlet assuming a particular potential only when the potentials at the two inlets of said comparator are both at said second value, and so arranged that the first inlet of the $i$th $(1 \leq i \leq n)$ comparator out of the $j$th $(1 \leq j \leq m)$ series is connected with the $i$th outlet of the $j$th generator and that the second inlet of the same $i$th comparator out of the the same $j$th series is connected to the $i'$th outlet of the $j'$th generator with $i'=i+1$ for $i<n$ and $i'=1$ for $i=n$ and identical relations between $j'$ and $j$, while the outlets from all $n$ comparators out of the same series are connected to an individual electrically bistable device normally in one stable condition and transferred to its other stable condition upon said particular potential being present on one of the outlets from the comparartors as a result of which the corresponding generator may be put out of action.

Figure 2:
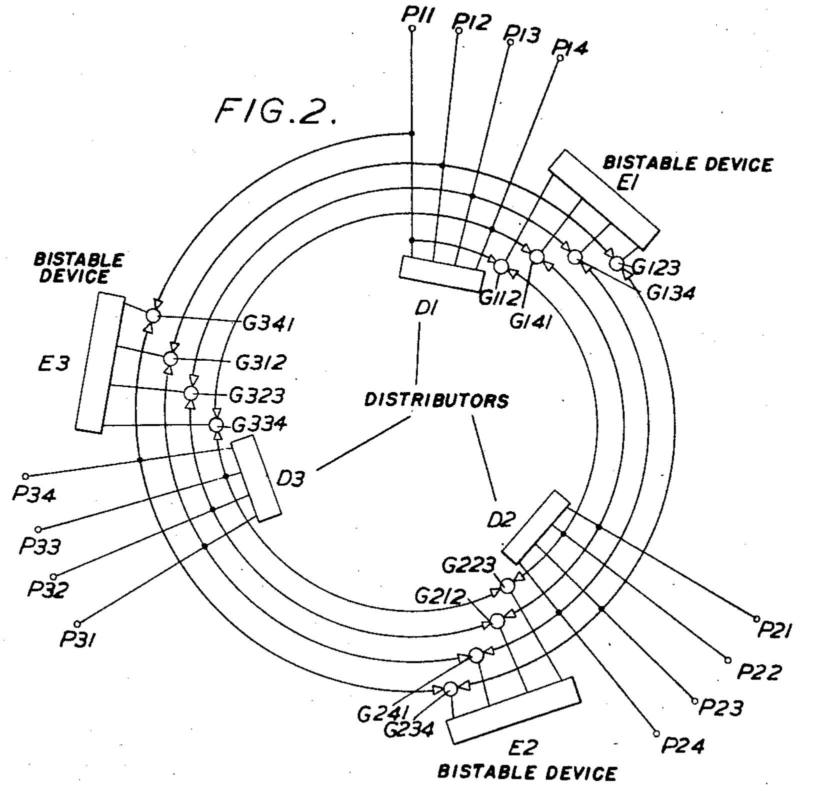
Figure 4:
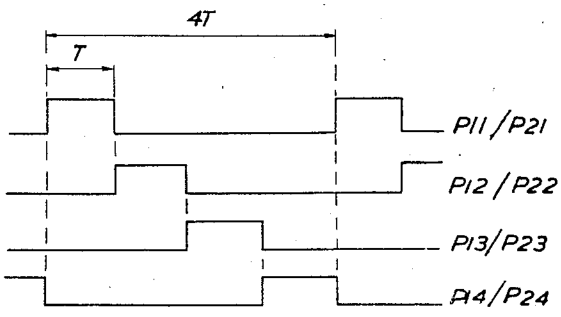
Figure 3:
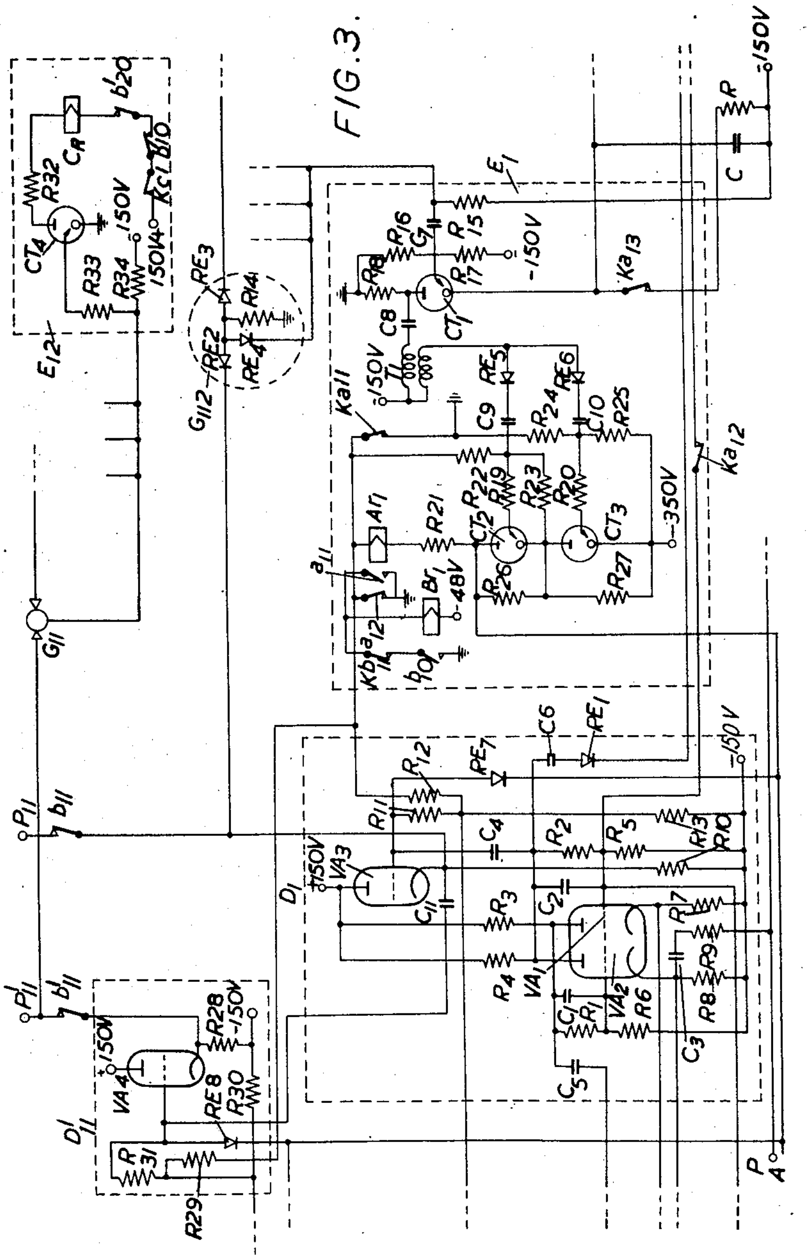

The above mentioned and other objects and features of the invention will become more apparent and the invention itself will be best understood by referring to the following description of an embodiment taken in conjunction with the accompanying drawings which represent:

Fig. 1, control means for two synchronized pulse distributors in accordance with the invention and in block schematic form;

Fig. 2, a diagram illustrating the principle of the control in the case of three pulse distributors operating in synchronism;

Fig. 3, detailed embodiments of the elements shown in block schematic form in Figs. 1 and 2;

Fig. 4, pulse waveforms issued by the pulse distributors shown in the preceding figures.

Referring to Fig. 1, two identical pulse distributors $D_1$ and $D_2$ are shown each with four stages, each of which delivers pulses of duration T and period 4T respectively at terminals $P_{11}$, $P_{12}$, $P_{13}$, $P_{14}$, and $P_{21}$, $P_{22}$, $P_{23}$ and $P_{24}$. The corresponding pulse wave forms are shown in Fig. 4. The distributors are essentially ring counters and each stage may be assumed to include two valves associated as an Eccles-Jordan circuit, the anode circuit of one of these valves being coupled to the grid circuit of a third valve which has its cathode circuit connected to the terminal such as $P_{11}$ and is therefore a cathode follower tube arrangement used as a buffer stage to isolate the Eccles-Jordan circuit from external electrical conditions. Normally, one of the valves forming each Eccles-Jordan circuit is conductive while the other is not, and four corresponding valves each forming half of an Eccles-Jordan circuit in one distributor such as $D_1$ are associated so that only one of these can be conductive at the same time. Circuit $D_1$ can therefore occupy four distinct stable conditions in sequence when it is driven by trigger pulses applied at terminal $P_A$, these pulses following one another with a period equal to T.

Two cross connections are indicated in Fig. 1 interconnecting the distributors $D_1$ and $D_2$. These can be used in the manner disclosed in the Belgian Patent No. 504,606 (C. Weill-C. Hannigsberg 6-5) to synchronize the distributors $D_1$ and $D_2$, so that when a pulse is issued at the terminal such as $P_{11}$, a pulse is also simultaneously issued at terminal $P_{21}$ and so on.

Terminal $P_{11}$ is connected to the left-hand inlet of the comparator $G_{112}$, the right-hand inlet of which is connected to terminal $P_{22}$ from the second distributor $D_2$. This comparator $G_{112}$ is in effect a gate which is represented as a small circle with two outside conductors provided with arrows pointing towards its centre and corresponding with the gate inlets, plus a conductor pointing also towards the centre of the circle representing the gate and constituting the gate outlet. This gate is so arranged, that it is only when pulses are simultaneously appearing at terminals $P_{11}$ and $P_{22}$, that a pulse will be issued at the outlet conductor from gate $G_{112}$. In all other three cases, i.e. a pulse at terminal $P_{11}$ only, a pulse at terminal $P_{22}$ only, or no pulses at either terminals, no pulse will appear at the outlet conductor from gate $G_{112}$ which is connected to an electrically bistable device $E_1$. To this device are also connected the outlets of similar gates $G_{123}$, $G_{134}$ and $G_{141}$, the inlets of which are respectively connected to terminals $P_{12}$ and $P_{23}$, $P_{13}$ and $P_{24}$, $P_{14}$ and $P_{21}$. A similar bistable device $E_2$ is also provided to which the outlets from the gates $G_{212}$, $G_{223}$, $G_{234}$ and $G_{241}$ are connected, the inlets of these last four gates being respectively connected to terminals $P_{21}$ and $P_{12}$, $P_{22}$ and $P_{13}$, $P_{23}$ and $P_{14}$, and $P_{24}$ and $P_{11}$. These gates are all of the $G_{112}$ type.

Both the devices $E_1$ and $E_2$ are normally in one particular stable condition and will remain in the latter as long as both distributors issue their respective pulses during the respective pulse time intervals in accordance with the outlets concerned. If it is assumed, for example, that after having issued a pulse at terminal $P_{11}$ due to the reversal of the corresponding Eccles-Jordan circuit, the distributor $D_1$ continues to issue such a pulse during the next T interval, the said Eccles-Jordan circuit having failed to revert back to its stable condition corresponding with no pulse at terminal $P_{11}$, this incorrect pulse condition during the next T interval will correspond with a pulse at terminal $P_{22}$, assuming that the other distributor $D_2$ is functioning normally. As pulses coincide at the two inlets of the gate $G_{112}$, a pulse will therefore be issued at the gate outlet and this will be used to trigger the bistable device $E_1$ to its second stable condition. A lead is shown going out from the device such as $E_1$ to the various stages of the distributor $D_1$ and upon the device $E_1$ having been triggered to its second stable condition, a new potential will appear on said lead which will be used in a manner which will be more clearly appreciated from Fig. 3 to block all the stages of the distributor $D_1$. Then, pulses can no longer be issued at terminals $P_{11}$, $P_{12}$, $P_{13}$ and $P_{14}$ but the distributor $D_2$ will continue to supply normal pulses at terminals $P_{21}$, $P_{22}$, $P_{23}$ and $P_{24}$. If terminals such as $P_{11}$ and $P_{21}$ are connected to a common load each via individual unidirectional capacitive couplings, e.g. a suitably poled rectifier in accordance with the polarity of the pulses in series with a condenser, the fact that pulses are no longer delivered at terminal $P_{11}$ will not affect in any way the delivery of the pulses from terminal $P_{21}$ to the common load. Apart from the fact that the reaction of the device $E_1$ immediately puts the faulty distributor $D_1$ out of action, its reaction can also be used to raise an alarm whereby immediate steps can be taken to switch in a third and spare distributor in place of the faulty distributor $D_1$. This is not shown in Fig. 1 and can be accomplished manually or automatically by any means known in the art.

It will be remarked that if a faulty pulse condition appears at terminal such as $P_{11}$ during the time that a pulse condition normally appears at terminal $P_{22}$, this faulty pulse condition might persist until a pulse condition normally appears at terminal $P_{24}$. This is conditioned by the time taken by the device such as $E_1$ to move from its first stable condition to its second and by the duration T as well as the number of outlets $n$ of the distributors. In the case of high frequency pulses and with a small number $n$ of outlets for the distributors, it might well happen that the device $E_1$ has not completely reacted by the time a pulse normally appears at terminal $P_{24}$. To prevent that such a normal pulse at terminal $P_{24}$ coinciding with an incorrect spurious pulse condition at terminal $P_{11}$ which results in the gate $G_{241}$ delivering a pulse at its output lead would also trigger the device $E_2$ whereby both the latter and the device $E_1$ being triggered to their second stable condition, both distributors $D_1$ and $D_2$ would be blocked, the operation of one device $E_1$ immediately prevents the operation of the other device $E_2$. This is shown in Fig. 1 by two leads issuing respectively from the devices $E_1$ and $E_2$ and being commoned to a negative potential via a common resistor R. The operation of either device from its first stable condition to its second stable condition results in a flow of current through resistor R and the difference of potential so produced across this resistor automatically prevents the other device such as $E_2$ from being triggered to its second stable condition. Since in the case of a faulty pulse condition at terminal $P_{11}$, it is the device $E_1$ which will be first to start to trigger to its second stable condition, the other device $E_2$ which can only start to trigger $(m-1)T$ seconds after, has no chance of being brought to its second stable condition and the distributor $D_2$, in the example considered, will continue to function normally.

While suitable couplings of corresponding distributor outputs to common loads will prevent that the absence of a pulse from a particular outlet at the right moment would affect the delivery of the proper pulse to the common load, such a condition should nevertheless be rapidly detected since if it is followed by a fault in the other distributor, which is an unlikely probability in a short time, but may occur in the long run, this could pass undetected and the loads would no longer be supplied with the correct pulses.

To detect the absence of a pulse at the right time, the terminals such as $P_{11}$ are also connected to other comparators such as $G_{11}$ which are essentially gates and identical to those such as $G_{112}$. The terminal $P_{11}$ is connected to the left-hand inlet of the gate $G_{11}$ via a buffer stage D′ associated with each distributor stage and which may be constituted by a valve operated in cathode follower fashion with its cathode circuit connected to terminal $P'_{11}$ which is itself directly connected to the left-hand inlet of gate $G_{11}$. Such an additional buffer stage is not essential to the invention but may be required to obtain two different types of pulses which have identical wave forms but the levels of which may differ and be used for different purposes. This may be the case for example in the arrangement disclosed in the above mentioned Belgian Patent No. 512,583 (C. Weill-C. Hannigsberg 8–7). The right-hand inlet of the gate $G_{11}$ is connected to terminal $P_{21}$ exactly in the same way as the left-hand inlet is connected to terminal $P_{11}$ i.e. through terminal $P'_{21}$ and the additional buffer stage $D'_{21}$.

If it is now assumed that no pulse is delivered at terminal $P_{11}$ during the appropriate time interval or also incidentally that no corresponding pulse is delivered at terminal $P_{11}$ due to a failure of the buffer stages $D'_{11}$ or $D_{11}$, there will be no pulse at the left-hand inlet of the gate $G_{11}$ whereas there will be one at the right-hand inlet of this gate, assuming of course, that the other distributor $D_2$ together with its associated additional buffer stages $D'_{21}$, $D'_{22}$, $D'_{23}$ and $D'_{24}$ function normally. Therefore, the gate $G_{11}$ will fail to deliver an output pulse whereas it normally delivers one every time that pulses are simultaneously delivered at terminals $P'_{11}$ and $P'_{21}$. As similar gates $G_{22}$, $G_{33}$ and $G_{44}$ have their inlets respectively connected to terminals $P'_{12}$ and $P'_{22}$, $P'_{13}$ and $P'_{23}$ and $P'_{14}$ and $P'_{24}$, when the two distributors function normally, there is a succession of pulses appearing at the outlets of the gates $G_{11}$, $G_{22}$, $G_{33}$ and $G_{44}$ which are all connected to an electrically bistable device $E_{12}$. Such pulses following one another in close succession, they can be commoned on a bus bar which will therefore assume a continuous potential equal to the pulse level as long as the distributors function normally. The principle of commoning adjacent pulses on a bus bar for gap direction has already been disclosed in the Belgian Patent No. 512,583 (C. Weill-C. Hannigsberg 8–7) mentioned above. Upon a pulse being missed at terminal $P'_{11}$, there will be a sudden change of potential on the common bus bar due to the gate $G_{11}$ failing to deliver a pulse and this can be used to trigger the device $E_{12}$ from its first and normal stable condition to its second stable condition in which an alarm will be given.

It will be remarked that whereas in the Belgian Patent No. 512,583 (C. Weill-C. Hannigsberg 8–7) pulses from stages analogous to $D'_{11}$, $D'_{12}$, $D'_{13}$ and $D'_{14}$ were grouped on a common bus bar so that failure of one pulse could be detected by a sudden change of the continuous potential on the bus bar, this was done individually for each distributor, due to the use of the comparators or gates such as $G_{11}$, the equipment such as $E_{12}$ becomes common for both distributors instead of an individual equipment being used for each. This might be of particular advantage when the number of distributors to be paralleled is increased beyond two, which might be the case if these distributors are rather inexpensive as low power devices whereby a group of $m$ distributors, each capable of delivering $$\frac{1}{m-1}$$

of the total power required by the load might be considered advantageous.

In the case of several identical power amplification stages being connected in parallel to common outlets from twin distributors, there might be $m_1$ power stages paralleled on the first common distributor outlet, $m_2$ on the next, etc. and the gates such as $G_{11}$ would merely have to be provided with as many inlets as there are power stages for the distributor outlet concerned, i.e. $m_1$, there being a single bistable device such as $E_{12}$ for the complete arrangement of the $m_1+m_2+ \ldots m_n$ power stages.

In the case of more than two distributors being paralleled, the gates such as $G_{11}$ would have to be provided each with as many inlets as there are distributors and would fail to deliver an outlet pulse upon a pulse being missed at one of the inlets.

The connection from the devices such as $E_1$ has been shown to extend not only to the distributor $D_1$ but also to the four additional buffer stages $D'_{11}$, $D'_{12}$, $D'_{13}$ and $D'_{14}$ to indicate that when the latter are used they can also be blocked upon $E_1$ detecting a faulty condition.

Also, in the case of more than two distributors operating in parallel, or more than two similar outlets for each type of pulse, the arrangement including the devices $E_1$ and $E_2$ could still be applied and an embodiment for three distributors operating in parallel is represented in Fig. 2.

Therein, three devices $E_1$, $E_2$ and $E_3$ are used corresponding respectively with the distributors $D_1$, $D_2$ and $D_3$. Every distributor outlet is connected to two comparators or gates such as $G_{112}$ and $G_{341}$ for outlet $P_{11}$. Connections are sequentially made as can be readily observed, each comparator or gate such as $G_{112}$ having one of its two inlets (the number of inlets for this type of gate remains equal to two, irrespective of the number of paralleled distributors) connected to a pulse outlet from one distributor and its second inlet connected to the next pulse outlet in the next distributor, there being therefore $m$ seriese of $n$ comparators or gates such as $G_{112}$ and $m$ bistable devices such as $E_1$ when $m$ is the number of distributors.

Referring to Fig. 3, a stage of the distributor $D_1$ has been shown in detail together with a buffer stage $D'_{11}$, the gate $G_{112}$, the bistable device $E_1$ and the bistable device $E_{12}$.

Each distributor stage essentially comprises two valves $VA_1$ and $VA_2$, shown as a double triode and connected in the Eccles-Jordan manner with mutual plate-grid couplings respectively formed by the shunt combinations of resistor $R_1$ and condenser $C_1$ and resistor $R_2$ and condenser $C_2$. Both plates are also connected to a positive supply of +150 volts via individual resistors $R_3$ and $R_4$. The grids are further connected to a negative supply of —150 volts via individual resistors $R_5$ and $R_6$. The cathode of $VA_1$ is also connected to —150 volts via resistor $R_7$ which is used in common for all the tubes similar to $VA_1$ and forming the rest of the distributor. The value of this common resistor $R_7$ is so chosen that when one valve of the $VA_1$ series is conductive, none of the remaining valves of this series in the distributor $D_1$ can be made conductive due to the potential drop across the resistor. The cathode of $VA_2$ is also connected to —150 volts via a resistor $R_8$ used in common for all the valves of the $VA_2$ series forming the distributor $D_1$ but resistor $R_8$ does not perform a blocking function analogous to that performed by resistor $R_7$. Further, the common cathodes of the valves of the $VA_2$ series are connected to terminal $P_A$ via condenser $C_3$ and resistor $R_9$ in series. To this terminal $P_A$ are applied the trigger pulses of period T which are negative and which will produce successive reversals of the stages forming the distributors $D_1$ and $D_2$.

The anode of $VA_2$ is coupled to the grid of a further valve $VA_3$, via condenser $C_4$, this valve having its plate connected to +150 volts and its cathode to —150 volts via resistor $R_{10}$, its grid being biassed through resistor $R_{11}$ by the potentiometer arrangement comprising resistors $R_{12}$ and $R_{13}$ in series between ground and —150 volts via contacts $ka_{11}$ or $a_{12}$ included in the bistable device $E_1$. The valve $VA_3$ operates as a cathode follower and has its cathode connected to terminal $P_{11}$ via contact $b_{11}$ of a relay $Br_1$ included in the bistable device $E_1$.

If it is assumed that the plate of $VA_2$ is "high," this corresponds to a pulse condition at terminal $P_{11}$ and by virtue of the common resistor $R_7$ the plates of the remaining valves of the $VA_2$ series are "low," whereas the plate of $VA_1$ is low and the plates of the remaining valves of the $VA_1$ series are high. Upon the next negative trigger pulse being received at terminal $P_A$, this will increase the positive bias between the grid and the cathode of $VA_2$ whereby in well known cumulative fashion, $VA_2$ will now conduct whereas $VA_1$ will be made non-conductive, the plate of $VA_2$ becoming low and that of $VA_1$ becoming high. The resulting positive pulse at the plate of $VA_1$ will be transmitted to the grid of the corresponding $VA_1$ valve in the next stage of the distributor via condenser $C_5$ whereby this last valve will become conductive, whereas the valve in the same stage will be made non-conductive resulting in a positive pulse being applied at terminal $P_{12}$. At the same time that the plate of the valve $VA_2$ in the second stage of the distributor becomes high, it sends a positive pulse via condenser $C_5$ to the grid of the valve $VA_2$ in the first stage, whereby the last valve which was made conductive by the negative flank of the negative trigger pulse will be unable to change its condition upon the positive flank of the negative trigger pulse being applied to its cathode via condenser $C_3$ since the potential at its grid will be raised at the same time. The time constants are, of course, suitably chosen so that the positive flanks of the negative trigger pulse which are applied at terminal $P_A$ arrive at a time when the effect of the positive pulse at the plate of $VA_2$ in the second stage of the distributor $D_1$ has not yet subsided. The duration of the negative pulses at terminal $P_A$ will, of course, be chosen appreciably smaller than T.

It should be noted that if for any reason the second stage of the distributor $D_1$ fails to change its condition upon the trigger pulse being received, then the positive flank of the trigger pulse applied at terminal $P_A$ will be effective to reduce the grid-cathode bias of the valve $VA_2$ in the first stage whereby it is again valve $VA_1$ which will conduct and valve $VA_2$ which will be non-conductive in the first stage. This means that the plate of $VA_2$ will remain high during the next T interval and if the distributor $D_2$ functions in the right manner, a pulse appears at terminal $P_{22}$ corresponding to the plate of the valve $VA_2$ in the second stage of distributor $D_2$ being high, whereby the gate $G_{112}$ will detect the faulty condition of distributor $D_1$.

The plate of $VA_2$ in $D_1$ is further connected to the grid of the valve $VA_1$ (not shown) in the first stage of the distributor $D_2$ via the condenser $C_6$ in series with the rectifier $RE_1$ and through the contact $ka_{12}$ of a key $KA_1$ in the bistable device. A similar connection exists between $VA_2$ in $D_2$ and $VA_1$ in $D_1$. These connections exist only between the first stages of the two distributors and permit to effect the synchronization of the two distributors when the contact such as $ka_{12}$ is closed allowing a positive pulse at the plate of the valve $VA_2$ (not shown) in distributor $D_2$ to be applied to the grid of valve $VA_1$ in the first stage of the distributor $D_1$ making the valve conductive in correspondence with the fact that the valve $VA_1$ in the first stage of distributor $D_2$ is also conductive. As the synchronization is bound to occur after a period smaller than $n$T, if the latter is small the two distributors will be synchronized when the key such as $KA_1$ is released. A temporary link between the first stages of the distributors $D_1$ and $D_2$ avoids loading of the grid circuits of the valves $VA_1$ by additional circuits which would otherwise complicate the desgin and reduce the safety of operation. As soon as the two distributors are synchronized, the synchronizing link can be cut off without inconvenience since a phase lag of one distributor behind the other will cause the control means to operate and to block the lagging distributor.

It will be noticed that a phase lead of one distributor in front of the other will pass undetected or rather be incorrectly detected as a lag of the other distributor. Such an occurrence is however, to be deemed very unlikely. It can in fact be dealt with in the case of at least three distributors working in parallel (Fig. 2) by coupling the outlet from the gate such as $G_{112}$ not directly to the device $E_1$ but to the first inlet of a further gate whose second inlet is connected to terminal $P_{32}$ and whose outlet is connected to device $E_1$ and exhibits a potential suitable to trigger the latter device when pulses are simultaneously applied to the inlets of said further gate. As the chances of both the distributors $D_2$ and $D_3$ simultaneously exhibiting the same fault, i.e. leading, are practically nihil, device $E_1$ will be correctly triggered upon distributor $D_1$ showing a fault such as lagging. This still leaves the leading of one distributor with respect to the others undetected, but the latter can be performed by also connecting the outlet from the gate such as $G_{112}$ to the first inlet of yet another gate whose second inlet is connected to terminal $P_{31}$ and whose outlet is connected to device $E_2$. Then, if a pulse appears at the outlet of $G_{112}$ and corresponds with one at $P_{31}$ the device $E_2$ will be triggered as distributor $D_2$ is in all likelihood leading with respect to the others.

Such an arrangement does not seem essential in practice but could be economically realized in the form of two series of $mn$ gates each with three inputs such as $P_{11}$, $P_{22}$, $P_{32}$ for the first series and $P_{24}$, $P_{34}$, $P_{11}$ for the second, outlets from $n$ gates of the first series and from $n$ of the second being connected to each device such as $E_1$, the first detecting lag and the second lead.

Considering the case of the plate of $VA_2$ being left high after a negative trigger pulse and for example as a result of the second stage of distributor $D_1$ failing to change from one stable condition to the other, the time constant of the circuit $C_4$, $R_4$, $R_{11}$ is sufficiently high with respect to the T to maintain a pulse condition at the cathode of $VA_3$ during the next T interval. As both the cathode of $VA_3$ in the first stage of the distributor $D_1$ and in the second stage of the distributor $D_2$ are now high, this potential will appear at the junction point of the oppositely poled series rectifiers $RE_2$ and $RE_3$ which are part of the gate $G_{112}$ connected between the cathodes of these last mentioned valves. As this junction point of the rectifiers is connected to ground via resistor $R_{14}$, when the distributors $D_1$ and $D_2$ are functioning normally, the potential at the junction point of the rectifiers $RE_2$ and $RE_3$ is always equal to the low potential which occurs at the cathode of a valve $VA_3$ when the plate of the corresponding $VA_2$ valve in the same distributor stage is low. Upon both cathodes of the valves $VA_3$ in the first stage of the distributor $D_1$ and in the second stage of distributor $D_2$ being relatively high, there will therefore be a positive pulse at the junction point of rectifiers $RE_2$ and $RE_3$ which will be applied via rectifier $RE_4$ also connected to the junction point of the first two rectifiers, to the input of the bistable device $E_1$.

Rectifier $RE_4$ is provided with a leak to −150 volts via resistor $R_{15}$ and the junction point of rectifier $RE_4$ with resistor $R_{15}$ is coupled to the trigger electrode of a cold cathode tube $CT_1$ via condenser $C_7$. The trigger electrode of this tube is biassed by means of the potentiometer formed by resistors $R_{16}$ and $R_{17}$ in series between ground and −150 volts, whereas the anode of this tube is connected to ground through resistor $R_{18}$ and the cathode to −150 volts through contact $ka_{13}$ of key $KA_1$ and resistor R, already shown in Fig. 1, and which is used in common for biassing the cathode of the corresponding $CT_1$ tube in $E_2$ to prevent simultaneous ionization of both these tubes. The bypass condenser C is in shunt across this common resistor R.

Tube $CT_1$ is normally de-ionized, but upon a positive pulse being applied to its trigger electrode, it is made conductive thereby producing a potential drop across resistor $R_{18}$ which is transmitted as a negative pulse to the primary winding of a transformer $T_1$ via condenser $C_8$. Both the primary and the secondary windings of transformer $T_1$ are biassed to −150 volts and the negative pulse in the primary winding is transformed into a positive pulse in the secondary winding which is applied in common to the trigger electrodes of two cold cathode tubes $CT_2$ and $CT_3$ via the series combinations of rectifier $RE_5$, condenser $C_9$ and resistor $R_{19}$ and rectifier $RE_6$, condenser $C_{10}$ and resistor $R_{20}$. The main gaps of the tubes $CT_2$ and $CT_3$ are serially connected between ground and −350 volts with the cathode of $CT_2$ directly connected to the anode of $CT_3$, and in series with resistor $R_{21}$, winding of relay $Ar_1$ and contact $ka_{11}$ of the key $KA_1$. The use of these two cold cathode tubes in series permits to obtain a sufficient change of potential at the anode of tube $CT_2$ upon the tubes $CT_2$ and $CT_3$ being simultaneously ionized due to a positive pulse being delivered across the secondary of transformer $T_1$. The change of potential required is greater than $V_A - V_B$, where $V_A$ is the anode-cathode triggering potential at which a tube ionizes independently of the potential at the trigger electrode and where $V_B$ is the sustaining potential of the main gap. With this arrangement, the two tubes $CT_2$ and $CT_3$ can have their main gaps serially connected across a source of potential $V_C$ which need only be smaller than $2V_A$. The trigger electrode of $CT_2$ is positively biassed with respect to its cathode by means of the potentiometer arrangement comprising resistors $R_{22}$ and $R_{23}$ while the trigger electrode of $CT_3$ is correspondingly biassed by means of the potentiometer arrangement comprising resistors $R_{24}$ and $R_{25}$. Resistors $R_{26}$ and $R_{27}$ respectively connected across the main gaps of the tubes $CT_2$ and $CT_3$ serve to determine the cathode potential of $CT_2$ corresponding with the anode potential of $CT_3$ when the tubes are de-ionized.

Upon a positive pulse issued by the gate such as $G_{112}$ causing the ionization of both the tubes $CT_2$ and $CT_3$, relay $Ar_1$ will be energized and this can be used to operate an alarm circuit. At the same time, the sharp drop of potential which occurs at the anode of tube $CT_2$ will be transmitted to the grids of all the valves such as $VA_3$ in all stages of the distributor $D_1$ through individual rectifiers such as $RE_7$ in the first stage of distributor $D_1$. This rectifier is normally non-conductive but will now become conductive whereby the low potential at the anode of tube $CT_2$ will be applied to the control grids of all the valves of the $VA_3$ series in distributor $D_1$. This potential is of the order of 140−350=−210 volts which is sufficient to bring the valves such as $VA_3$ beyond cut-off.

The operation of relay $Ar_1$ results in the operation of relay $Br_1$ through make contact $a_{11}$ and this relay locks through its make contact $b_{10}$ and the key contact $kb_{11}$. The operation of relay $Br_1$ results in the opening of all the contacts such as $b_{11}$ which disconnect the terminals such as $P_{11}$ from the corresponding outputs of the distributor $D_1$. Relay $Ar_1$ is also provided with a break contact $a_{12}$ which normally supplies an additional ground for the anode of tube $CT_2$. This permits, when the key $KA_1$ has been depressed after a fault had been detected in the distributor $D_1$, to maintain the circuit of the main gaps of the tubes $CT_2$ and $CT_3$ closed, whereby if the faulty condition remains after the key $KA_1$ has been released, re-establishing the main gap circuit of tube $CT_1$ through break contact $ka_{13}$, to have the tubes $CT_2$ and $CT_3$ again ionized upon tube $CT_1$ ionizing. Otherwise, the time constants of the circuit might result in tube $CT_1$ being again ionized if the fault remains but without causing the ionization of the tubes $CT_2$ and $CT_3$ if the pulse of transformer $T_1$ arrives before the main gap circuit of the tubes $CT_2$ and $CT_3$ is established through break contact $ka_{11}$.

The additional buffer stage $D'_{11}$ is shown to include a valve $VA_4$ which operates as a cathode follower, having its anode directly connected to +150 volts, its cathode connected to −150 volts via resistor $R_{28}$, and its grid being coupled to the cathode of valve $VA_3$ in the corresponding stage of distributor $D_1$ and through condenser $C_{11}$. The grid of $VA_4$ is also biassed by a potentiometer arrangement which includes resistors $R_{29}$ and $R_{30}$ serially connected between ground via contacts $ka_{11}$ or $a_{12}$, and −150 volts, the grid being connected to the junction point of these two resistors via resistor $R_{31}$. The positive pulses at the cathode of $VA_4$ reach terminal $P'_{11}$ through break contact $b'_{11}$ of relay $Br_1$ and terminal $P'_{11}$ will therefore be disconnected in the same way as terminal $P_{11}$ upon relay $Br_1$ being operated. This will be preceded in exactly the same manner as for the various stages of distributor $D_1$ by an electronic blocking due to the lowering of the anode potential of tube $CT_2$ being transmitted to the grid of all the valves such as $VA_4$ in the additional buffer stages $D'_{11}$, $D'_{12}$, $D'_{13}$, $D'_{14}$ via the rectifier such as $RE_8$, upon tubes $CT_2$ and $CT_3$ being ionized.

The comparison between the pulses at terminal $P'_{11}$ with those at terminal $P'_{21}$ is effected as already explained by the gate $G_{11}$ which is not shown in detail in Fig. 3 as it is identical to gate $G_{112}$. The outlets from the four gates $G_{11}$, $G_{22}$, $G_{33}$ and $G_{44}$ are applied in common, since they include decoupling rectifiers, to the grid-cathode circuit of a cold cathode tube $CT_4$ constituting the bistable device $E_{12}$ together with the relay $Cr$ included in its anode circuit in series with resistor $R_{32}$ between +150 volts and the plate of $CT_4$ via break contacts $kc_1$, $b'_{10}$ and $b'_{20}$, these last two belonging respectively to relays $Br_1$ and $Br_2$, the latter not shown as it is included in device $E_2$ similar to $E_1$. The control electrode of $CT_4$ is connected to −150 volts through resistors $R_{33}$ and $R_{34}$ in series, the junction point of these being connected to the outlet from the gates such as $G_{11}$. Normally, one of the gates of the $G_{11}$ series supplies a potential at its outlet which is not sufficiently negative to break the auxiliary gap of tube $CT_4$, but upon a pulse being missed, the potential at the junction point of resistors $R_{33}$ and $R_{34}$, the latter of which has a high value with respect to the resistor (not shown) forming part of the gate such as $G_{11}$, in the same way as $R_{15}$ is large with respect to $R_{14}$, will drop to create a negative potential difference between the control electrode and the cathode of $CT_4$, which is sufficient to cause the ionization of the tube and thereby the energization of the associated relay *Cr*. The fact that this relay is energized can then be used in any suitable manner to raise an alarm. Key contact $kc_1$ of key KC permits to extinguish tube $CT_4$. It will also be remarked that as soon as either relay $Br_1$ or relay $Br_2$ (not shown) operates, tube $CT_4$ is prevented from ionizing, this in order not to indicate a fault in an additional buffer stage such as $D'_{11}$ and when it is a faulty distributor stage in either $D_1$ or $D_2$ which has caused the corresponding *Br* relay to energize. Contacts $b'_{10}$ and $b'_{20}$ perform this task.

While the principles of the invention have been described above in connection with specific apparatus, it is to be clearly understood that this description is made only by way of example and not as a limitation on the scope of the invention.

We claim:

A plurality of *m* pulse generators producing substantially identical pulses comprising at least a *j*th generator having an *i*th outlet and a *j'*th generator having an *i'*th outlet, each generator having *n* outlets, $n-1$ of which are at any instant at a first potential value while the remaining outlet is at a second potential value, the 1st, 2nd, . . . and *n*th outlets of each generator in turn assuming said second potential value for a time period T once every complete pulse period *n*T, a plurality of *m* electrically bistable devices, and comparator means to compare the potential on a predetermined outlet of the *j*th generator with the potential on a predetermined outlet of the *j'*th generator, said comparator means comprising *m* series of potential comparators, comprising at least a *j*th series having an *i*th comparator and a *j'*th series having an *i'*th comparator, each series having *n* comparators, each comparator having two inlets and one outlet, said comparator outlet assuming a particular potential only when the potentials at the two inlets of said comparator bear a particular predetermined relationship with respect to one another and are so connected that the first inlet of the *i*th comparator of the *j*th series is connected to the *i*th outlet of the *j*th generator and the second inlet of the same *i*th comparator of the same *j*th series is connected to the *i'*th outlet of the *j'*th generator with $i'=i+1$ for $i<n$ and $i'=1$ for $i=n$, the outlets from all *n* comparators of the same series being connected to an individual one of said plurality of bistable devices which is normally in one stable condition and is transferred to its other stable condition upon said particular potential being present on one of the outlets from the comparators as a result of which the corresponding generator may be put out of action, said particular predetermined relationship being obtained when one outlet from each of two generators is connected to one comparator and both generator outlets are at said second potential value, wherein *m, n, i, i', j* and *j'* are integers, and means connecting together the bistable devices for preventing their simultaneous operation to a new stable state.

References Cited in the file of this patent

UNITED STATES PATENTS

| | | |
|---|---|---|
| 2,021,034 | Thompson | Nov. 12, 1935 |
| 2,415,654 | Place | Feb. 11, 1947 |
| 2,533,285 | Sager | Dec. 12, 1950 |
| 2,595,301 | Sager | May 6, 1952 |
| 2,616,977 | Staal | Nov. 4, 1952 |
| 2,628,346 | Burkhart | Feb. 10, 1953 |
| 2,689,950 | Bayliss | Sept. 21, 1954 |